(12) United States Patent
Billet

(10) Patent No.: US 7,063,300 B2
(45) Date of Patent: Jun. 20, 2006

(54) DEVICE FOR FIXING AND ADJUSTING A MEMBER TO BE SUPPORTED

(75) Inventor: Jacques Billet, Nandy (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/662,888

(22) Filed: Sep. 15, 2003

(65) Prior Publication Data

US 2004/0105138 A1    Jun. 3, 2004

Related U.S. Application Data

(63) Continuation of application No. PCT/FR02/00895, filed on Mar. 13, 2002.

(30) Foreign Application Priority Data

Mar. 21, 2001 (FR) .................................... 0103842

(51) Int. Cl.
   *A47G 1/24* (2006.01)
(52) U.S. Cl. ................. 248/476; 248/603; 359/872
(58) Field of Classification Search ............. 248/163.1, 248/476, 614, 603; 359/223, 224, 846, 871, 359/872, 881
   See application file for complete search history.

(56) References Cited

U.S. PATENT DOCUMENTS

| | | | | |
|---|---|---|---|---|
| 4,226,507 A | * | 10/1980 | Fuschetto | .................... 359/849 |
| 4,655,563 A | * | 4/1987 | Plante et al. | ................. 359/849 |
| 4,763,991 A | * | 8/1988 | Klotz, Jr. | ..................... 359/896 |
| 4,806,068 A | * | 2/1989 | Kohli et al. | ................ 414/735 |
| 4,988,244 A | | 1/1991 | Sheldon et al. | |
| 5,473,852 A | * | 12/1995 | Lindsey | ...................... 52/648.1 |
| 5,726,815 A | | 3/1998 | Gunter et al. | |
| 5,844,732 A | * | 12/1998 | Huiban et al. | .............. 359/872 |
| 6,047,610 A | * | 4/2000 | Stocco et al. | ............ 74/479.01 |
| 6,099,217 A | * | 8/2000 | Wiegand et al. | ............ 409/201 |
| 6,240,799 B1 | * | 6/2001 | Yau | ......................... 74/490.03 |
| 6,267,348 B1 | | 7/2001 | Perret | |
| 6,402,329 B1 | | 6/2002 | Bailly et al. | |
| 6,420,329 B1 | | 7/2002 | Callaghan et al. | |

FOREIGN PATENT DOCUMENTS

| | | |
|---|---|---|
| DE | 29607680 | 4/1996 |
| FR | 2761486 | 3/1997 |
| FR | 2773890 | 1/1998 |

* cited by examiner

OTHER PUBLICATIONS

International Search Report for PCT/FR02/00895, dated Jan. 23, 2003, 3 pages.

*Primary Examiner*—Korie Chan
(74) *Attorney, Agent, or Firm*—Harness, Dickey & Pierce, P.L.C.

(57) ABSTRACT

The invention concerns a device for fixing and adjusting a member to be supported, characterised by the fact that it comprises: a support base (1); two triangular levers (6), each of the said levers comprising two arms (7, 8) disposed in a triangle and connected together at one of the vertices (9) of the triangle, each of the said levers being articulated on the said base at its respective vertex, a first one (7) of the two arms of each lever being extendable and connected at its free end to means of fixing (14) to the said member; and an adjustment means (5) mounted on the said base and arranged to make the second arm (8) of each lever pivot in the plane of the said lever. Application to the fixing and adjustment of a precision optical element.

7 Claims, 3 Drawing Sheets

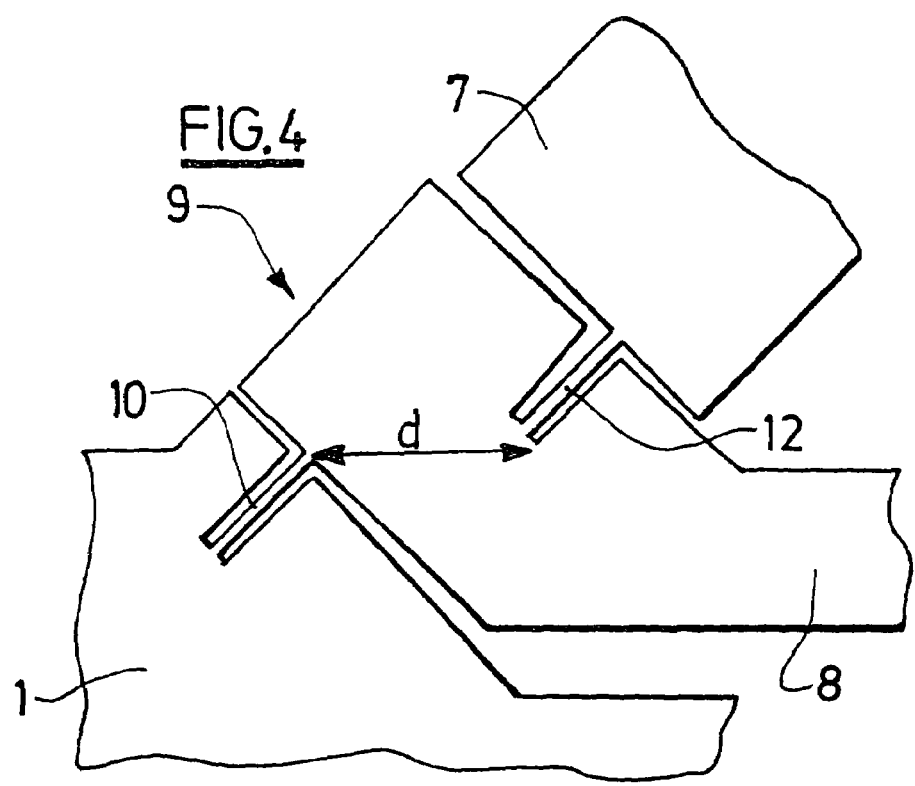
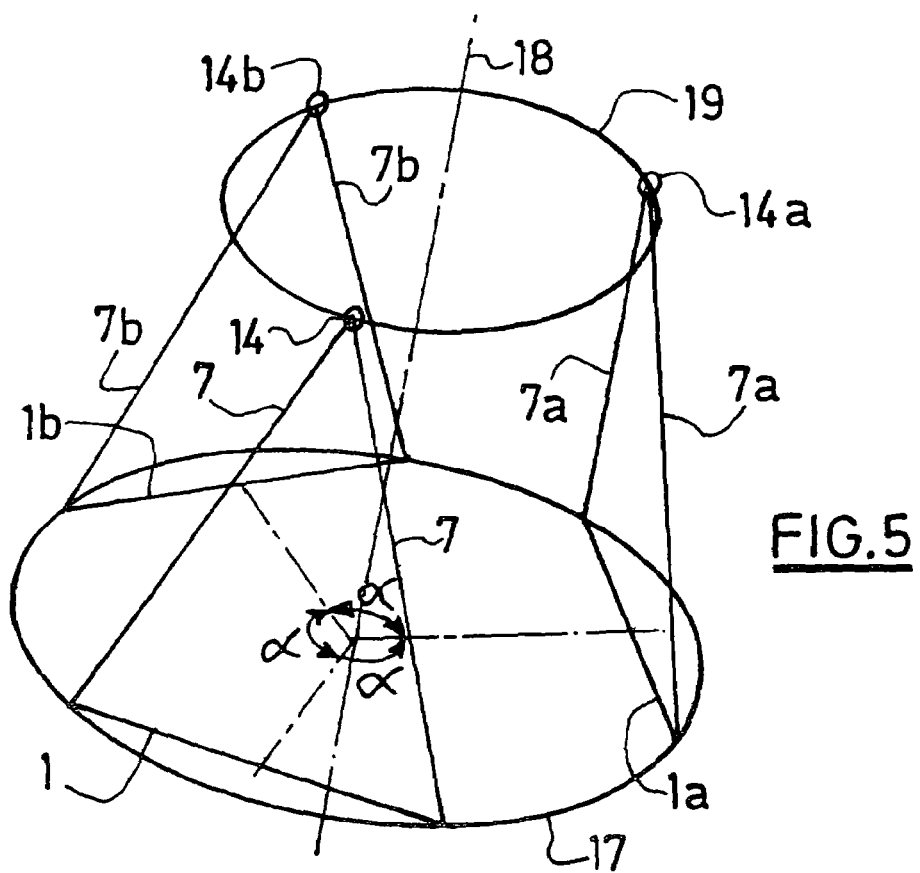

DEVICE FOR FIXING AND ADJUSTING A MEMBER TO BE SUPPORTED

This application is a continuation of PCT/FR02/00895, filed on Mar. 13, 2002.

FIELD

The present invention concerns a device for fixing and adjusting a member to be supported, such as a precision optical element.

BACKGROUND

A certain number of devices used for the positioning and orientation in space of various members with respect to any base are already known. By way of examples isostatic devices of the tri-bipod type or Stewart platforms can be cited. The latter consist of six struts of adjustable length connecting the member to be positioned and to be oriented on the base. These six adjustable lengths provide six degrees of freedom corresponding to three position coordinates and three position angles. The essential properties of these devices are the precision of the adjustment able to be obtained, the amplitude of the adjustment field, and their stiffness.

SUMMARY

The present invention aims to provide a fixing and adjustment device with two degrees of freedom which, assembled in groups of three, gives a fixing and adjustment assembly with six degrees of freedom of the above type. More particularly, the invention aims to provide such a device giving a high precision of adjustment.

To this end, the object of the invention is first of all a device for fixing and adjusting a member to be supported, such as a precision optical element, characterised by the fact that it comprises: a support base; two triangular levers, each of the said levers comprising two arms disposed in a triangle and connected together at one of the vertices of the triangle, each of the said levers being articulated on the said base at its respective vertex, a first one of the two arms of each lever being extendable and connected at its free end to means of fixing to the said member; and adjustment means mounted on the said base and arranged to make the second arm of each lever pivot in the plane of the said lever. This device therefore provides two degrees of freedom each corresponding to the means of adjustment of one of the levers. It will be seen below that it allows a high degree of gearing down between the adjustment means and the position of the fixing means.

In a particular embodiment, each of the said levers is articulated on the base about an axis substantially perpendicular to the plane of the said lever. More particularly, each of the said levers can be articulated on the base by means of a blade substantially perpendicular to the plane of the respective lever.

Also in a particular embodiment, the two levers are substantially in the same plane. Also in a particular embodiment, the first arm of each lever is articulated on the second arm at the respective vertex of the lever. Also in a particular embodiment, the first arm of each lever is articulated on the said fixing means. The articulations mentioned above can be articulations of the swivel type.

More particularly, each of the articulations can comprise at least two blades, one of which is substantially in the plane of the respective lever and the other one of which is substantially perpendicular to this plane. Even more particularly, the other blade can be in a plane substantially parallel to the first arm of the respective lever. The blade by which the lever is articulated on the base can in particular be in a plane substantially parallel to that of the said other blade. In this way a double articulation is produced.

In general terms, the said blades can be produced in a single piece with the respective lever. The articulations are therefore without play. Moreover, the blades provide the optomechanical filtering of the adjustment and interferences. In a particular embodiment, the said adjustment means are means of adjustment without play.

More particularly, the said adjustment means can comprise a thrust finger actuated by a motor and acting on the said second arm of the respective lever counter to the action of the elastic means. Even more particularly, the said motor can be a piezoelectric actuator. The said motor may be removable.

Another object of the invention is an assembly for fixing and adjusting a member to be supported, such as a precision optical element, characterised by the fact that it comprises three devices as described above, whose respective fixing means are arranged to be fixed to the said member at three distinct points. More particularly, the three devices can be disposed around a central axis in a symmetry of rotation of substantially 120°.

BRIEF DESCRIPTION OF THE DRAWINGS

A description will now be given, by way of non-limiting example, of a particular embodiment of the invention, with reference to the accompanying schematic drawings, in which:

FIG. 4 is a view similar to FIG. 2 illustrating the functioning of the device; and FIG. 5 is a diagram of a fixing and adjustment assembly according to the invention.

DETAILED DESCRIPTION OF VARIOUS EMBODIMENTS

Figure 1:
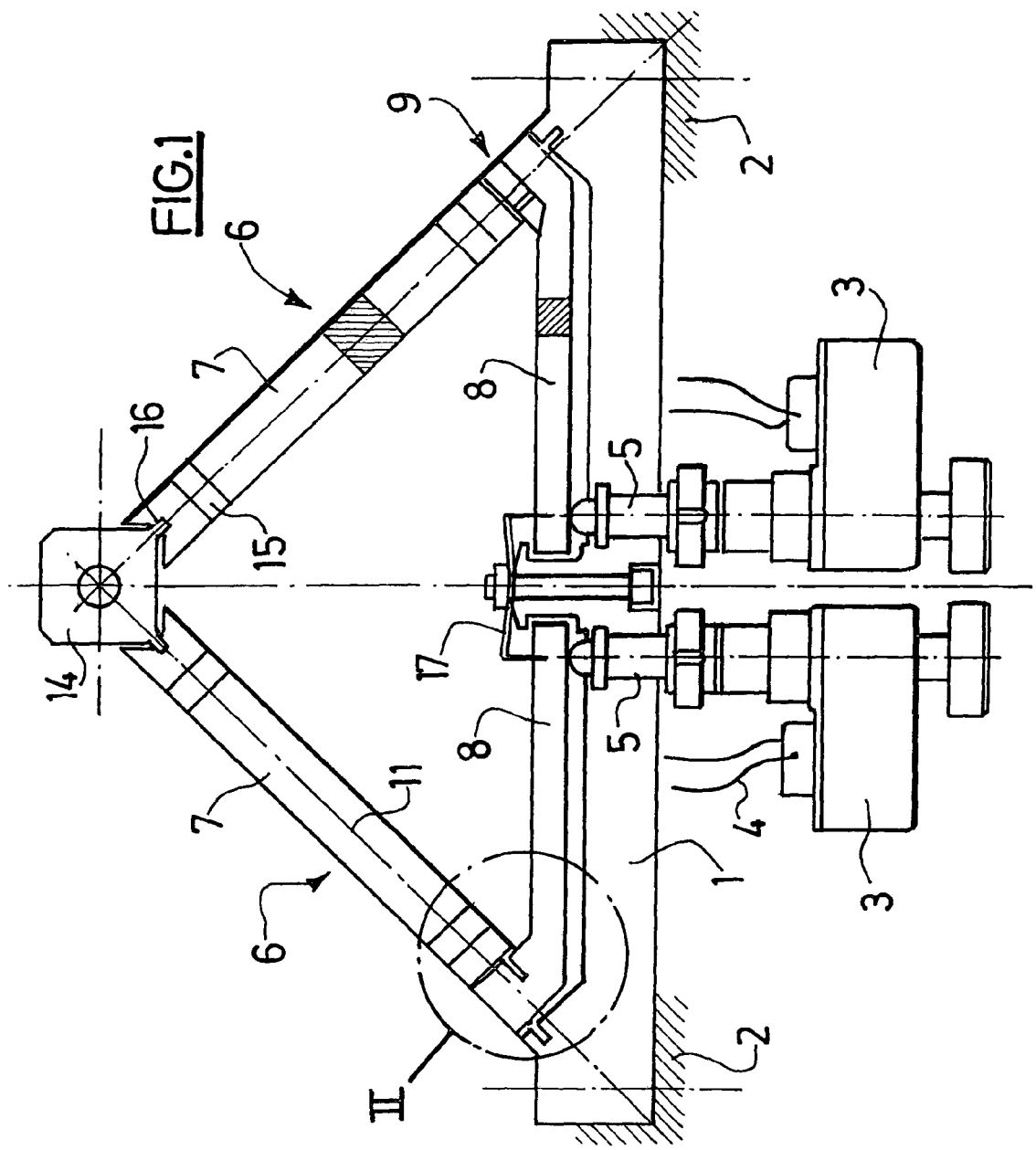
FIG. 1 is an elevation view of a fixing and adjustment device according to the invention.
Figure 2:
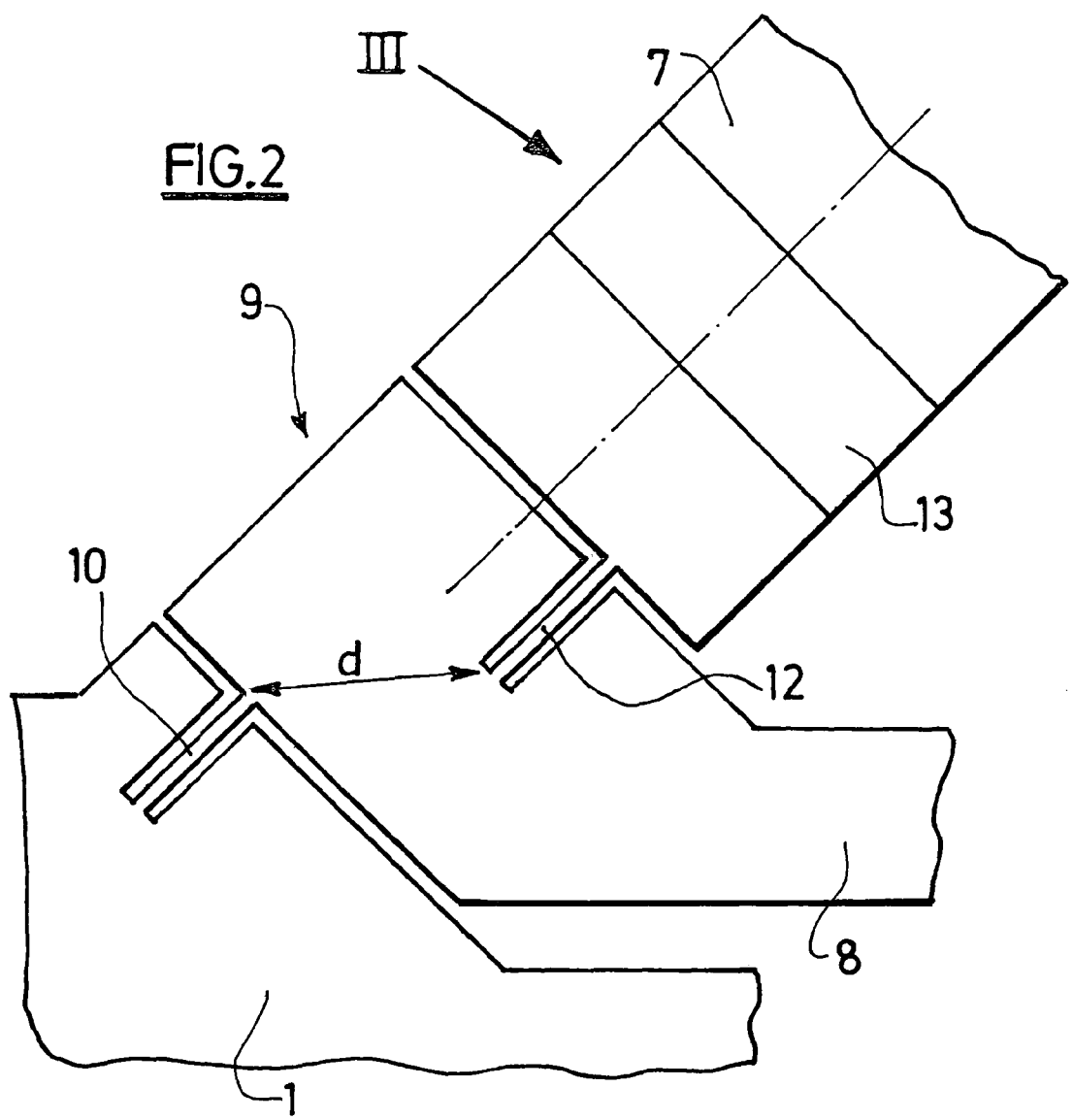
FIG. 2 is a view to a larger scale of the detail II in FIG. 1.
Figure 3:
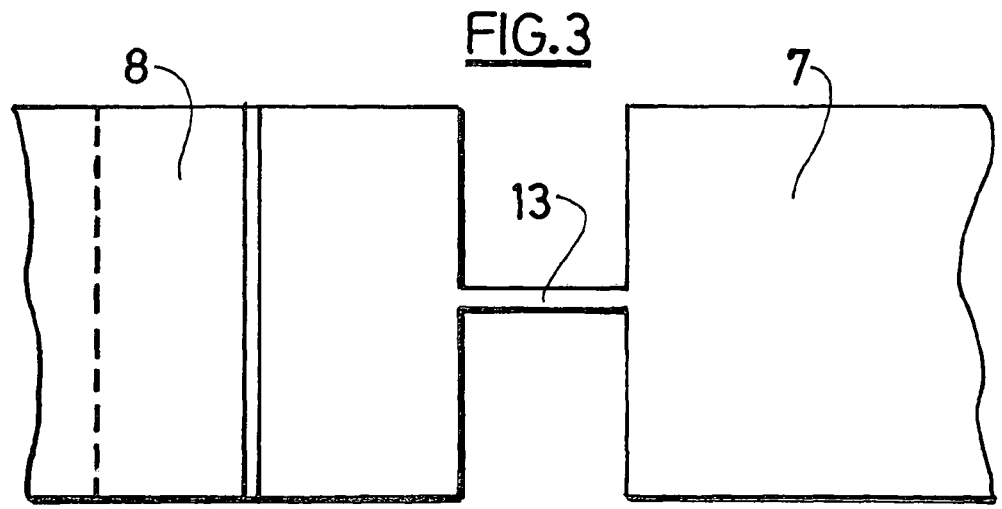
FIG. 3 is a view in the direction of the arrow III in FIG. 2.

The device in FIG. 1 comprises firstly a support base 1 fixed rigidly by any suitable means to a mounting platform 2. The base 1 supports two piezoelectric actuators 3 supplied by electrical conductors 4 and each arranged so as to move a thrust finger 5. After adjustment, the fingers 5 can be locked by means which are not shown and the actuators can also be withdrawn. It should be noted that this locking does not disturb the device.

Two substantially symmetrical triangular levers 6 are each mounted at one of the ends of the base 1, substantially in the same plane. Each lever 6 is formed by two arms 7 and 8 with a generally square cross-section connected together at one of the vertices of the triangle which they delimit.

The end of each arm 8 adjacent to the arm 7 is articulated on the base 1 about an axis substantially perpendicular to the plane of the levers 6. For this purpose, this end of the arm 8 is connected to the base 1 by a blade 10 substantially perpendicular to the plane of the levers 6 and substantially parallel to the axis 11 of the arm 7. The curvature of this blade provides the rotational degree of freedom of the arm 8 in the plane of the lever 6.

A similar arrangement connects the arm 7 to the arm 8. A blade 12 is disposed between these two arms in a plane parallel to the plane of the blade 10 and situated at a certain distance from the latter plane. Another similar arrangement is formed at the end of the arm 7 adjacent to the arm 8, but with a blade 13 situated in the plane of the levers 6. The blade 13 therefore gives the arm 7 a rotational degree of freedom in a plane perpendicular to the plane of the levers 6.

The end of each arm 7 opposite to the arm 8 is connected to a fixing piece 14 by a similar arrangement with two perpendicular blades. A first blade 15 is interposed on the end of the arm 7 in the plane of the levers 6 and a second blade 16 connects this end to the piece 14. The blade 16 is perpendicular to the plane of the levers 6 and passes through the axis 11.

The end of each arm 8 opposite to the vertex 9 of the respective lever 6 is acted on by one of the fingers 5 counter to the action of a spring 17. The finger 5 is arranged to push the end of the arm 8 so as to drive it in rotation about the articulation consisting of the blade 10.

It can be seen in FIG. 4 that such a rotation, permitted by the two flexible blades 10 and 12 as well as by the blade 16 of the respective lever and by the homologous blades of the other lever, causes an extension of the distance between the blade 10 and the piece 14, corresponding to the movement of the finger 5 geared down in the ratio of the distance d between the blades to the length of the arm 8. The result is a movement of the piece 14 in the plane of the levers 6, the combined action of these levers providing the two degrees of freedom in this plane.

The adjustment is therefore geared down to the extent required by the design. In addition, this adjustment does not degrade the element to be adjusted, the blades 10, 12, 13, 15 and 16 providing both the kinematics of the device and the mechanical filtering of the forces and movements applied at the fixing piece 14.

In FIG. 5 three devices like the one which has just been described can be seen. The three bases 1, 1a and 1b are mounted in the same plane on a platform 17, at 120° from each other about an axis 18. An object 19 to be fixed and whose position and orientation with respect to the platform must be adjusted, for example a precision optical element, is mounted on the fixing pieces 14, 14a and 14b. Each pair of arms 7, 7a and 7b procures two degrees of freedom, so that the mounting has six degrees of freedom.

The position and orientation of the object 19 are adjusted by means of the six actuators 3. Naturally the six adjustments are not independent, each adjustment of an arm 7 generally leading to a modification of the length and/or orientation of the other arms. A person skilled in the art will know how to adopt the most appropriate global adjustment algorithm.

The device therefore provides the functions of conventional isostatic strength (in six-leg configuration) and adjustment. The base 1, the levers 6 and the fixing piece 16 are here produced in a single piece.

What is claimed is:

1. An optical support comprising:
   a first arm of fixed length;
   a second arm of fixed length;
   at least a third arm of fixed length, the arms defining a substantially triangular shape;
   a first joint coupling the first and second arms;
   a second joint coupling the second and third arms, each of the first and second joints further comprising a first substantially flat blade and an adjacent second substantially flat blade, flats of the blades being offset from each other and flexible; and
   at least one actuator causing the first arm to move relative to the second arm by flexing the blades of at least one of the joints.

2. The support of claim 1 wherein the actuator automatically pushes against the third arm in a direction substantially perpendicular to an elongated direction of the third arm.

3. The support of claim 1 further comprising a spring biasing a portion of the third arm toward the actuator, the spring being located on an opposite side of the third arm from the actuator.

4. An optical support comprising:
   a first arm;
   a second arm;
   at least a third arm, the arms defining a substantially triangular shape;
   at least first and second substantially flat blades coupling the first and second arms together, the first and second blades being flexible in primarily different directions;
   at least third and fourth substantially flat blades coupling the second and third arms together, the third and fourth blades being flexible in primarily different directions; and
   an actuator pushing against the third arm in a direction substantially perpendicular to an elongated direction of the third arm.

5. The support of claim 4 wherein the actuator linearly pushes against a portion of the third arm adjacent a substantially free end thereof.

6. The support of claim 4 further comprising a biasing member pushing a portion of the third arm toward the actuator.

7. The support of claim 4 wherein the arms have fixed lengths.

* * * * *